United States Patent Office 3,687,637
Patented Aug. 29, 1972

3,687,637
COMBINED SILENCER AND EXHAUST GAS CLEANER
Saburo Okamura, c/o Hibiya Bussan Co., Ltd., 2 banchi 1-chome Yurakucho, Chiyoda-ku, Tokyo, Japan
Filed Sept. 14, 1970, Ser. No. 71,975
Claims priority, application Japan, Sept. 18, 1969, 44/74,268
Int. Cl. B01j 9/04; F01n 3/14
U.S. Cl. 23—288 F
11 Claims

ABSTRACT OF THE DISCLOSURE

A combined silencer and exhaust gas cleaner comprising a plurality of diffusing and expanding chambers connected in series to an exhaust gas inlet pipe. Each chamber preferably comprises separable bowl-shaped shells. A conical baffle plate is disposed internally of each chamber. Inner and outer coaxial cylindrical wire net tubes are supported by the baffle plate and contain a catalyst therein for absorbing the harmful components contained in the exhaust gas.

---

Figure 1:
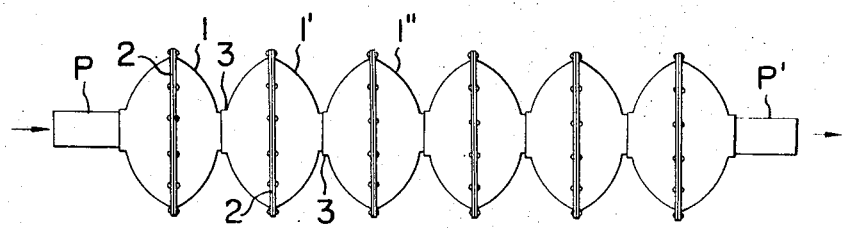

This invention relates to an exhaust gas cleaner and also relates to a silencer for internal combustion engines especially for automobiles. More particularly this invention relates to an exhaust gas cleaner of a catalyst contact type and it is proposed to provide a cleaner operating also as a silencer which has a comparatively simple structure and is effective in cleaning exhaust gas.

Moreover as this invention operates also as a silencer, there is no necessity for providing a separate silencing device.

There is skillfully combined a cleaning mechanism of the exhaust gas with a silencing mechanism of the flow of gas so that the whole apparatus is able to be made small in size.

Moreover this invention includes catalysts effective in removing and making harmless the harmful components in the exhaust gas and also the catalysts are arranged by excellent means so that the exhaust gas is cleaned effectively.

The apparatus is also easy to take apart to exchange the catalysts.

Figure 2:
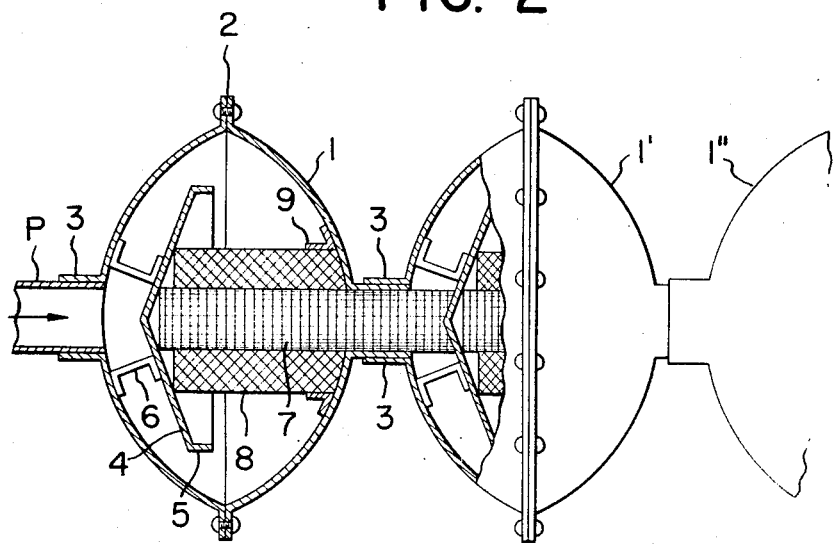

In the drawings:

FIG. 1 is a general elevation view and FIG. 2 is a partial sectional figure to show the inner main parts of the apparatus of the present invention.

In one preferred embodiment of the invention shown in FIG. 2, the cleaner comprises an exhaust gas inlet pipe P, several diffusing and expanding chambers 1, 1' . . . connected thereto in a straight line, cylindrical wire net tubes 7 and 8 supported concentrically in each diffusing and expanding chamber, catalysts held between the cylindrical wire net tubes 7 and 8, and an exhaust gas outlet pipe P'.

The diffusing and expanding chamber 1 comprises two bowl-shaped shells facing and joined to each other at peripheral edges 2 by methods such as rivet joint or bolt joint. That is, two bowl-shaped shells are jointed at the jointing portion 2 to seal hermetically and not to leak the exhaust gas therefrom. The diffusing and expanding chamber is provided with jointing tubes 3 which are inserted hermetically in those of the adjacent diffusing and expanding chambers for connecting one another in a straight line. The diffusing and expanding chamber is provided at an inner wall surface near the gas inlet side with several stays 6 which support a conical baffle plate 4. The vertex of the stainless steel conical baffle plate 4 is directed toward the exhaust gas inlet side and also is situated on a center line of the gas inlet pipe. The inner wall surface of the left hand bowl-shaped shell and the outer conical surface of the baffle plate 4 are properly spaced apart and nearly parallel to each other to provide an expanding chamber for the exhaust gas. The circular peripheral edge 5 of the baffle plate 4 has a larger diameter than the outer diameter of the cylindrical wire net tube 8. The peripheral edge 5 may be bent to be cylindrical as shown in FIG. 2.

The cylindrical wire net tubes 7 and 8 are concentrically supported in the diffusing and expanding chamber. The cylindrical wire net tube 7 of small diameter is inserted into contact with an inner surface of a jointing tube 3 of the adjacent diffusing and expanding chamber. The left end of the net tube 7 is in contact with the inner wall surface of the baffle plate 4 and the right end is in contact with the outer wall surface of the baffle plate in the right-hand adjacent diffusing and expanding chamber.

The left end of the cylindrical net tube 8 of large diameter is in contact with the inner wall surface of the conical baffle plate 4 and the right end is supported at the inner wall surface of the diffusing and expanding chamber by being inserted into a tubular supporting member 9 projecting therefrom. All of the connected diffusing and expanding chambers have the same structures to support the conical baffle plates and the cylindrical wire net tubes.

The wire net tubes 7 and 8 are of stainless steel. Granulated catalysts are contained in the annular spaces between the wire net tubes 7 and 8. Naturally this invention will operate effectively by using one kind of catalyst to remove the harmful components of the exhaust gas but also this invention is more effective in removing the harmful components by using two kinds of catalysts as follows. There are contained gamma alumina (the first catalyst) as the granulated catalysts in the first one or two diffusing and expanding chambers and the mixed catalysts of platinum black and rodium (the second catalysts) in the next several connected diffusing and expanding chambers. The gamma alumina is made from aluminum hydroxide $(Al(OH)_3NH_2O)$ which is heated at a temperature of about 900° C. and has the properties of absorbing leads and sulfur dioxide. The mixed catalysts of the platinum black and rodium operate effectively to absorb mainly carbon monoxide.

How the apparatus of the invention operates is described hereinafter. As the diameter of the diffusing and expanding chamber is larger than that of the inlet pipe and has wide spaces between the wall of the bowl-shaped shell and the baffle plate, the exhaust gas which enters the diffusing and expanding chamber via the inlet pipe P from the internal combustion engine comes into collision with the conical baffle plate and expands outwardly. The gas then passes evenly through the cylindrical wire net tube 8 uniformly from the whole outer periphery of the tube and comes in contact with the catalysts between the above mentioned wire net tubes. And further, the gas enters the inner space of the wire net tube 7 and flows into the second chamber.

Thus the gas repeats diffusing and expanding and contacting with the catalysts in the diffusing and expanding chambers.

The cleaned gas is discharged out of the outlet pipe P' into the atmosphere. The pipe line apparatus also is designed to function as a silencer to make the explosive sound waves interfere with one another. When the exhaust gas passes through the apparatus of the invention, the gas is cooled rapidly by the adiabatic expansions in the diffusing and expanding chambers and the heat radiations from the outer walls of the bowl-shaped shells. The above mentioned cooling of gas and therefore the temperature drop of the gas are very effective for the silencer.

As the exhaust gas enters the diffusing and expanding chamber, it is diffused to the exterior by the baffle plate 4 and is guided by the inner wall surface of the left hand bowl-shaped shell and the curved inner surface of the other right hand shell, whereby the gas passes through the cylindrical wire net tube 8 at about right angles to make contact with the catalysts therein.

There are so far in use various kinds of exhaust gas cleaners of catalyst-contact type and particularly one apparatus that has a cylindrical tube of a larger diameter than an exhaust gas pipe from an engine and includes in its interior several catalyst containing chambers at proper intervals by partitioning by the wire nets at right angles to a center line of the tube.

In this apparatus, the gas goes straight on and passes through mainly a center portion of the catalysts only and therefore only a portion of the catalysts is effective.

Moreover there is a necessity for providing separate silencing device. One feature of this invention is clearly understood by comparing said apparatus with the gas contact over the entire catalysts in the apparatus of this invention.

As the catalysts used in this invention are granulated (about 2 mm. diameters), there are left proper clearances between the granulated catalysts in the cylindrical wire net tubes so that there does not occur a large back pressure when the gas passes therethrough.

Moreover the catalysts are charged to leave spaces at an upper portion in the wire net tubes so that the catalysts are agitated incessantly by vibrations of an automobile. Therefore the contacts of the gas with the catalysts become more uniform. The gamma alumina of the first catalyst is porous like sponge and has an extremely large contacting surface with the gas due to the fine porous passages.

The first catalysts absorb preferably the leads and the sulfur dioxide by contacting with the hot exhaust gas.

The removal by absorbing the leads and the sulfur dioxide by means of the first catalysts makes effective the removal of the carbon monoxide by means of the mixed catalysts of the platinum black and the rodium of the second catalysts. The catalysts of this kind operate effectively generally at a high temperature but the second catalysts have properties so as to operate effectively to remove the carbon monoxide even when the gas is cooled by passing through the apparatus. The carbon monoxide is reduced in content to 0.5 . . . 0.2 p.p.m. at the outlet of this apparatus by being absorbed by the second catalysts.

As described above, the apparatus of the invention has such a structure that it is not only effective as a silencer by means of diffusing and expanding and cooling of the exhaust gas but also the exhaust gas passage is formed extremely advantageously to make the gas come into contact with the catalysts. As there are used two kinds of catalysts, that is, the first catalysts and the second catalysts, there are removed at first the harmful components of the leads and the sulfur dioxide and therefore it makes more effective the function of the second catalysts.

It may be understood from the combined structures of the diffusing and expanding chambers and the cylindrical wire net tubes for holding the catalysts that the diffusing and expanding chambers are able to be separated one from another at the cylindrical jointing portions. The bowl-shaped shell itself is able to be separated at the jointing portion 2 and also the cylindrical wire net tubes 7 and 8 are able to be taken apart. Therefore it is easy to exchange the catalysts which have become inactive.

The bowl-shaped shell are made durable by using stainless steels. The bowl-shaped shell need not necessarily be spherically shaped as shown in FIG. 2 but may be formed as a truncated cone or polygonal pyramid.

I claim:

1. An exhaust gas cleaner and silencer, comprising:
   a first wall means defining a first diffusing and expanding chamber therein;
   second wall means defining a second diffusing and expanding chamber therein;
   inlet means associated with said first wall means for defining an exhaust gas inlet communicating with the upstream side of said first chamber, said inlet means being adapted to be connected to an exhaust gas pipe;
   connecting means fixedly connecting said first and second wall means in series with one another;
   means defining an intermediate flow passage providing communication between the downstream side of said first chamber and the upstream side of said second chamber, said flow passage being substantially aligned with said gas inlet and having a cross-sectional area substantially smaller than the cross-sectional area of each of said chambers;
   means associated with said second wall means for defining a gas outlet from the downstream side of said second chamber, said outlet being substantially aligned with said intermediate flow passage;
   a first substantially conical baffle member disposed within said first chamber, said baffle member being positioned between said gas inlet and said intermediate flow passage and having the apex thereof pointing toward and substantially aligned with said gas inlet;
   a second substantially conical baffle member disposed within said second chamber, said second baffle member being positioned between said intermediate flow passage and said gas outlet and having the apex thereof pointing toward and substantially aligned with said intermediate flow passage;
   a meshlike tubular support member disposed in said first chamber downstream of said first baffle member, said support member extending between said first baffle member and said first wall means and being substantially aligned with said intermediate flow passage; and
   catalyst means contained within said tubular support member and capable of absorbing the harmful components in the exhaust gas.

2. A device according to claim 1, including a second meshlike tubular support member disposed within said first-mentioned support member and extending substantially coaxially thereof, said second support member being substantially spaced from said first-mentioned support member to define an annular ringlike clearance space therebetween, said catalyst means being disposed within said clearance space.

3. An exhaust gas cleaner and silencer, comprising:
   first wall means including first and second separable bowl-shaped shells fixedly connected together and defining a first diffusing and expanding chamber therein;
   second wall means including third and fourth separable bowl-shaped shells fixedly connected together and defining a second diffusing and expanding chamber therein;
   inlet means associated with said first shell for defining an exhaust gas inlet communicating with said first chamber, said inlet means being adapted to be connected to an exhaust gas pipe;
   connecting means coacting between said second and third shells for fixedly connecting said first and second wall means in series with one another, said connecting means defining an intermediate flow passage providing communication between said first and second chambers, said flow passage having a cross-sectional area substantially smaller than the cross-sectional area of each of said chambers;
   means associated with said fourth shell for defining a gas outlet from said second chamber;
   a first substantially conical baffle member disposed substantially coaxially within said first chamber, said baffle member being positioned between said gas inlet and said intermediate flow passage and having the apex thereof pointing toward and substantially aligned with said gas inlet;

a second substantially conical baffle member disposed substantially coaxially within said second chamber, said second baffle member being positioned between said intermediate flow passage and said gas outlet and having the apex thereof pointing toward and substantially aligned with said intermediate flow passage;

a meshlike tubular support member disposed in said first chamber, said support member extending between said first baffle member and said second shell and being substantially aligned with said intermediate flow passage; and catalyst means contained within said tubular support member and capable of absorbing the harmful components in the exhaust gas.

4. A device according to claim 3, wherein said gas inlet, said intermediate flow passage and said gas outlet are all coaxially aligned with one another, and said device being substantially symmetrical about the longitudinally extending axis of each chamber.

5. A device according to claim 3, wherein said tubular support member is substantially cylindrical and has an external diameter substantially less than the maximum diameter of said first baffle member, and said first baffle member having a maximum cross-sectional area substantially less than the maximum cross-sectional area of said first chamber.

6. A device according to claim 3, wherein the catalyst means includes a mixed catalyst of platinum black and rodium.

7. A device according to claim 3, wherein the catalyst means includes gamma alumina.

8. A device according to claim 3, including a second meshlike tubular support member disposed within said first-mentioned support member and extending substantially coaxially thereof, said second support member being substantially spaced from said first-mentioned support member to define an annular ringlike clearance space therebetween, said catalyst means being disposed within said clearance space.

9. A device according to claim 8, wherein said second support member extends through said intermediate flow passage and into the interior of said second chamber, said second support member having the upstream end thereof disposed directly adjacent the downstream side of said first baffle member, and said second support member having the downstream end thereof positioned directly adjacent the upstream side of said second baffle member.

10. A device according to claim 3, including a plurality of further wall means each including a pair of separable bowl-shaped shells defining further diffusing and expanding chambers therein, said further wall means being connected in series with said second wall means, each of said further wall means including a baffle member, a meshlike tubular support member and catalyst means therein arranged substantially identical to the corresponding structure as disposed within said first chamber.

11. A device according to claim 10, wherein said catalyst means includes gamma alumina in the first diffusing and expanding chamber connected to the exhaust gas pipe and a mixed catalyst of platinum black and rodium in several of the other diffusing and expanding chambers.

References Cited
UNITED STATES PATENTS

| | | | |
|---|---|---|---|
| 2,218,063 | 10/1940 | Munger | 23—2E UX |
| 3,016,108 | 1/1962 | Myddelton | 23—288F UX |
| 3,094,394 | 6/1963 | Innes et al. | 23—288 F |
| 3,172,251 | 3/1965 | Johnson | 23—288F X |
| 3,186,806 | 6/1965 | Stiles | 23—288 F |
| 3,189,418 | 6/1965 | Gary | 23—288 F |
| 3,226,206 | 12/1965 | Hettich et al. | 23—288 F |
| 3,587,210 | 6/1971 | Shriner | 23—288F X |
| 3,597,165 | 8/1971 | Keith et al. | 23—288 F |

BARRY S. RICHMAN, Primary Examiner

U.S. Cl. X.R.

23—2 E